US011245712B2

(12) United States Patent
Oh et al.

(10) Patent No.: US 11,245,712 B2
(45) Date of Patent: Feb. 8, 2022

(54) METHOD AND APPARATUS FOR GENERATING VIRTUAL MALICIOUS TRAFFIC TEMPLATE FOR TERMINAL GROUP INCLUDING DEVICE INFECTED WITH MALICIOUS CODE

(71) Applicant: KOREA INTERNET & SECURITY AGENCY, Jeollanam-do (KR)

(72) Inventors: Sung Taek Oh, Jeollanam-do (KR); Woong Go, Jeollanam-do (KR); Mi Joo Kim, Jeollanam-do (KR); Jae Hyuk Lee, Jeollanam-do (KR); Jun Hyung Park, Jeollanam-do (KR)

(73) Assignee: KOREA INTERNET & SECURITY AGENCY, Jeollanam-do (KR)

( * ) Notice: Subject to any disclaimer, the term of this patent is extended or adjusted under 35 U.S.C. 154(b) by 240 days.

(21) Appl. No.: 16/517,500

(22) Filed: Jul. 19, 2019

(65) Prior Publication Data
US 2020/0169577 A1 May 28, 2020

(30) Foreign Application Priority Data

Nov. 28, 2018 (KR) .......................... 10-2018-0149569

(51) Int. Cl.
*H04L 29/06* (2006.01)
*G06N 20/00* (2019.01)

(52) U.S. Cl.
CPC ......... *H04L 63/1425* (2013.01); *G06N 20/00* (2019.01)

(58) Field of Classification Search
CPC ............. H04L 63/1425; H04L 63/1416; H04L 63/1433; H04L 63/0227; G06N 20/00;
(Continued)

(56) References Cited

U.S. PATENT DOCUMENTS 10,069,796 B2   9/2018  Park
10,705,821 B2*  7/2020  Yang .................. H04L 63/1408
(Continued)

FOREIGN PATENT DOCUMENTS

JP    2017-152852 A   8/2017
JP    2018-133004 A   8/2018
(Continued)

OTHER PUBLICATIONS

Valgenti et al., "Simulating Exploits for the Creation and Refinement of Detection Signatures," 2017 IEEE 25th International Symposium on Modeling, Analysis, and Simulation of Computer and Telecommunication Systems (MASCOTS) Year: 2017 | Conference Paper | Publisher: IEEE.*

(Continued)

*Primary Examiner* — Roderick Tolentino
(74) *Attorney, Agent, or Firm* — Sheppard Mullin Richter & Hampton LLP

(57) ABSTRACT

There is provided a method of generating malicious traffic, the method being performed by a computing apparatus and comprising obtaining traffic data transmitted from a first device infected with first malicious code or received by the first device, generating a traffic template of the first device by analyzing the traffic data, and generating a malicious traffic template of a terminal group, wherein the malicious traffic template of the terminal group comprises the traffic template of the first device.

14 Claims, 15 Drawing Sheets

(58) Field of Classification Search
CPC ...... G06F 21/544; G06F 21/56; G06F 21/562; G06Q 10/0635; H04W 12/128; H04W 12/12

See application file for complete search history.

(56) References Cited

U.S. PATENT DOCUMENTS

| | | | | |
|---|---|---|---|---|
| 10,798,167 | B2* | 10/2020 | Gonzalez | H04L 67/289 |
| 2014/0160961 | A1* | 6/2014 | Dragulescu | H04L 43/0894 370/252 |
| 2015/0319136 | A1 | 11/2015 | Xie et al. | |
| 2016/0241520 | A1* | 8/2016 | Seul | H04L 9/002 |
| 2017/0149830 | A1* | 5/2017 | Kim | H04L 63/1425 |
| 2017/0171226 | A1* | 6/2017 | Watkins | H04L 63/1416 |
| 2017/0244672 | A1* | 8/2017 | Shulman | H04L 12/4633 |
| 2018/0012021 | A1* | 1/2018 | Volkov | G06F 21/53 |
| 2019/0050561 | A1* | 2/2019 | Li | G06F 16/248 |
| 2019/0068616 | A1* | 2/2019 | Woods | H04L 63/145 |
| 2020/0036737 | A1* | 1/2020 | Crawford | G05B 19/058 |
| 2020/0092181 | A1* | 3/2020 | Thiagarajan | G06N 20/00 |

FOREIGN PATENT DOCUMENTS

| | | |
|---|---|---|
| JP | 2018-148270 A | 9/2018 |
| KR | 10-1679578 B1 | 11/2016 |
| KR | 10-2017-0091989 A | 8/2017 |
| KR | 10-2018-0024524 A | 3/2018 |
| KR | 10-2018-0083522 A | 7/2018 |

OTHER PUBLICATIONS

Hamdi et al., "A cloud-based architecture for network attack signature learning," 2015 7th International Conference on New Technologies, Mobility and Security (NTMS) Year: 2015 | Conference Paper | Publisher: IEEE.*

Notice of Allowance in Korean Patent Application No. 10-2019-0068713, dated Feb. 26, 2020.

Office Action in Korean Patent Application No. 10-2018-0149569, dated Dec. 26, 2018 (no translation available).

Baek, Ui-Jun et al., "Using Deep-Learning, Seed Based Sequential Grouping of Malicious Traffic," Proceedings of Symposium of the Korean Institute of communications and Information Sciences, 2018, pp. 742-743.

* cited by examiner

FIG. 7

| | INDIVIDUAL FUNCTION | | | | COMMON FUNCTION |
|---|---|---|---|---|---|
| AI SPEAKER | WEATHER CHECK | NEWS CHECK | TRAFFIC INFORMATION CHECK | MUSIC PLAYBACK | INTERNET CONNECTION CHECK  FW/SW UPDATE CHECK |
| SMART TV | VIDEO APPLICATION EXECUTION | | | | |
| SMART REFRIGERATOR | INTERNET SEARCH | | | | |
| SMART AIR CONDITIONER | AIR INFORMATION PROVISION | OEPRATION OF AIR CONDITIONER FROM THE OUTSIDE | | | |
| HOME CAMERA | PROVISION OF VIDEO OF OBJECT MOVING IN SPACE | | | | |
| SMART SCALE | WEIGHT DISPLAY | | | | |

FIG. 8

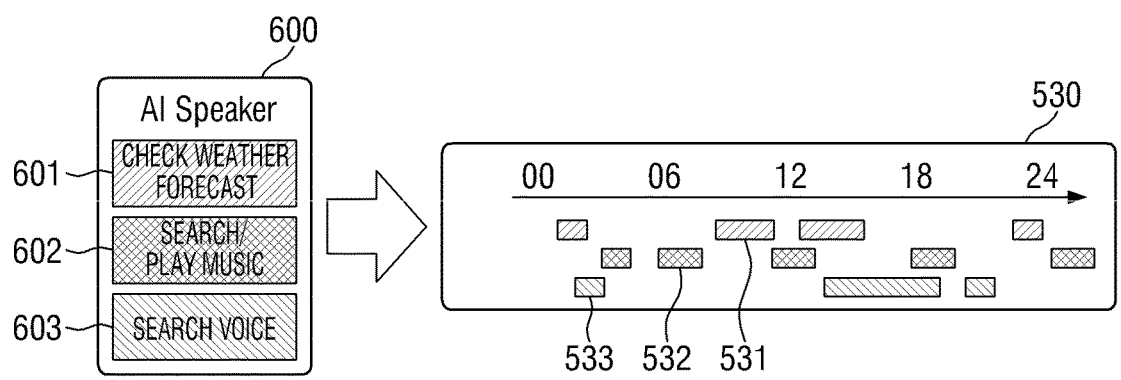

FIG. 10

|  | User A | | User B | |
|---|---|---|---|---|
|  | WEEKDAY | WEEKEND | WEEKDAY | WEEKEND |
| 06:00~08:00 | GET UP AND PREPARE FOR WORK<br>PLAY MUSIC(06:00)<br>CHECK WEATEHR (07:00) | PLAY MUSIC(10:00)<br>CHECK WEATEHR (11:00) | GET UP AND PREPARE FOR WORK<br>WATCH NEWS(7:00)<br>CHECK WEATEHR(7:00) |  |
| 08:00~18:00 | WORK<br>CHECK HOME CAMERA (10:00, 04:00)<br>CHECK AIR CONDITION (05:00)<br>OPERATE AIR CONDITIONER (05:00) | OUTING<br>CHECK HOME CAMERA (14:00) | WORK | CHECK WEATEHR (10:00)<br>PLAY MUSIC(10:00)<br>SEARCH RESTAURANT (11:00)<br>SEARCH REFRIGERATOR (13:00) |
| 18:00~22:00 | HOMECOMING<br>SEARCH REFRIGERATOR (19:00)<br>PLAY VIDEO(19:00)<br>CHECK WEATEHR (21:00) | HOMECOMING<br>PLAY VIDEO(19:00) | READING AFTER HOME<br>PLAY MUSIC(18:00) | PLAY VIDEO(18:00) |
| 22:00~24:00 | SLEEP | PLAY VIDEO | WATCH TV<br>RUN VIDEO APPLICATION (22:00) | PLAY VIDEO(22:00)<br>SLEEP |
| 24:00~06:00 | SLEEP | SLEEP | SLEEP | SLEEP |

FIG. 13

|  | User | CONSTITUENT DEVICE |
|---|---|---|
| Group 1 (IP/PORT) | A-type(1) | AI SMART TV_1 / SMART TV_1 / SMART REFRIGERATOR / SMART AIR CONDITIONER / SMART CAMERA |
| Group 2 (IP/PORT) | A-type(1) / B-type(1) | AI SMART TV_1 / SMART TV_1 / SMART REFRIGERATOR / SMART AIR CONDITIONER / SMART CAMERA |
| Group 3 (IP/PORT) | B-type(1) / C-type(1) | AI SPEAKER_2 / SMART TV_2 |
| Group 4 (IP/PORT) | A-type(2) / C-type(1) | AI SMART TV_1 / SMART TV_1 / SMART REFRIGERATOR / SMART AIR CONDITIONER / SMART CAMERA |
| Group 5 (IP/PORT) | D-type(1) / E-type(1) | AI SMART TV_2 / SMART TV_2 / SMART REFRIGERATOR / SMART CAMERA |

FIG. 14

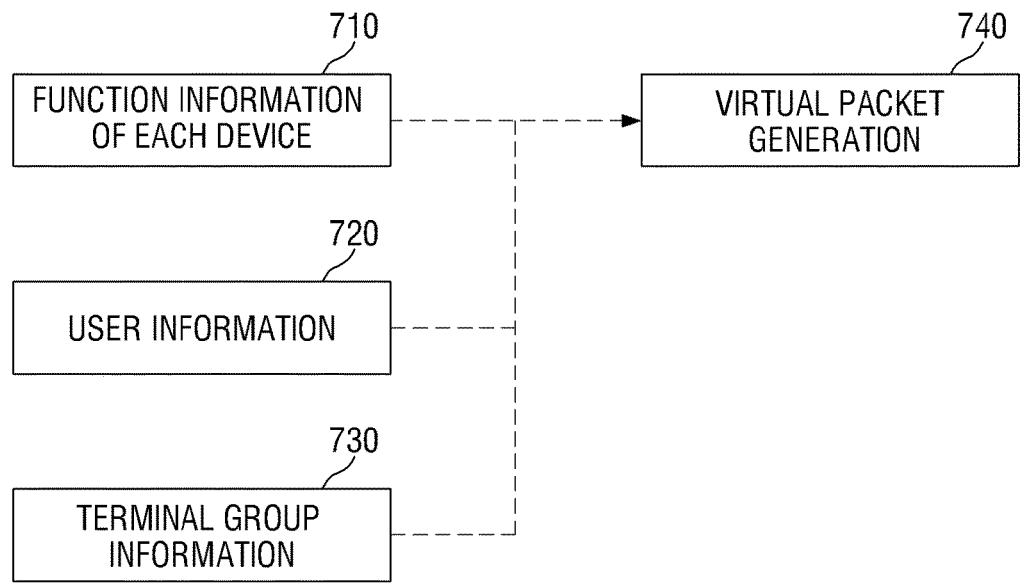

FIG. 15

| TERMINAL GROUP |||||
|---|---|---|---|
| ITEM | DESCRIPTION | TYPE | NOTE |
| Group_id | TERMINAL GROUP IDENTIFIER | string | |
| Bandwidth | INTERNET LINE BANDWIDTH | integer | Mbps (for normalization) |
| Mac_address | MAC ADDRESS OF TERMINAL GROUP AP | string | |

FIG. 16

| USER : USER BY TERMINAL GROUP ||||
|---|---|---|---|
| ITEM | DESCRIPTION | TYPE | NOTE |
| Group_id | TERMINAL GROUP IDENTIFIER | string | |
| User_id | INTERNET LINE BANDWIDTH | string | |
| user_template_id | DEVICE USER TYPE IDENTIFIER | string | |

FIG. 17

| DEVICE USAGE PATTERNS BY USER TYPE | | | |
|---|---|---|---|
| ITEM | DESCRIPTION | TYPE | NOTE |
| User_template_id | DEVICE USER TYPE IDENTIFIER | string | |
| Device_type_cd | DEVICE TYPE CODE | string | |
| Usage_template | | json | DEFINE DEVICE USAGE PATTERNS BY USER TYPE |

FIG. 18

| DEVICE TYPE | | | |
|---|---|---|---|
| ITEM | DESCRIPTION | TYPE | NOTE |
| Dev_type_cd | DEVICE TYPE CODE | string | |
| Dev_type_name | DEVICE TYPE NAME | string | |
| Dev_type_desc | DEVICE TYPE DESCRIPTION | string | |

FIG. 19

| FUNCTION | | | |
|---|---|---|---|
| ITEM | DESCRIPTION | TYPE | NOTE |
| Function_cd | DEVICE FUNCTION TYPE CODE | string | |
| Function_name | DEVICE FUNCTION TYPE NAME | string | |
| Function_desc | DEVICE FUNCTION TYPE DESCRIPTION | string | |

FIG. 20

| FUNCTION | | | |
|---|---|---|---|
| ITEM | DESCRIPTION | TYPE | NOTE |
| Dev_type_cd | DEVICE TYPE CODE | | |
| Function_cd | DEVICE FUNCTION TYPE CODE | | |
| Traffic_template | | json | DEFINITION OF TRAFFIC PATTERN (RULE) FOR EACH DEVICE/FUNCTION |

FIG. 21

| Time | Src IP | Src Port | Dst IP | Dst Port | Packet size |
|---|---|---|---|---|---|
| 01-01-2018 06:00:01 | 192.213.213.22 | 1420 | 123.234.23.126 | 300 | 45 |
| 01-01-2018 06:00:02 | 123.234.23.126 | 300 | 192.213.213.22 | 1420 | 46 |
| 01-01-2018 06:00:03 | 192.213.213.22 | 1420 | 123.234.23.126 | 300 | 251 |

METHOD AND APPARATUS FOR GENERATING VIRTUAL MALICIOUS TRAFFIC TEMPLATE FOR TERMINAL GROUP INCLUDING DEVICE INFECTED WITH MALICIOUS CODE

This application claims the benefit of Korean Patent Application No. 10-2018-0149569, filed on Nov. 28, 2018, in the Korean Intellectual Property Office, the disclosure of which is incorporated herein by reference in its entirety.

BACKGROUND

1. Field

The present disclosure relates to a method of generating a virtual malicious traffic template for a terminal group, and more particularly, to a method of generating virtual malicious traffic that may occur in a terminal group including a device actually infected with malicious code by using traffic data generated by the device.

2. Description of the Related Art

In an Internet of things (IoT) environment, various devices are connected by a network to form one terminal group. Since smart devices included in the terminal group are connected by a wired/wireless network, if one device is infected with malicious code, the malicious code can be rapidly transmitted to the entire terminal group. Therefore, there is a need for a rapid and accurate technology that can detect malicious code infection within the terminal group. Accordingly, various machine learning algorithms are being developed to detect malicious code infection using traffic data generated in a network.

In particular, a system for monitoring an IoT terminal group by utilizing machine learning technology using an anomaly detection model that performs unsupervised learning or an intrusion detection model that performs supervised learning is being actively developed. However, machine learning using an unrefined data model is very economically inefficient due to an unnecessary waste of resources, and an algorithm trained using the undefined data model has low accuracy. Therefore, it is required to provide a technology that generates an optimal learning model for a terminal group infected with malicious code.

SUMMARY

Aspects of the present disclosure provide a method and apparatus for generating a virtual malicious traffic template for a terminal group in a normal state and including a device infected with malicious code by using previously generated traffic information of the device.

Aspects of the present disclosure also provide a method and apparatus for generating a virtual malicious traffic template for a terminal group including a device not infected with malicious code by using traffic information generated by the device in a normal state.

Aspects of the present disclosure also provide a method and apparatus for generating an optimal learning model, which can be used for machine learning used in a malicious code monitoring system of a terminal group, by using a malicious traffic template for the terminal group.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to another aspect of the present disclosure, there is provided a method of generating malicious traffic, the method being performed by a computing apparatus and comprising obtaining traffic data transmitted from a first device infected with first malicious code or received by the first device, generating a traffic template of the first device by analyzing the traffic data, and generating a malicious traffic template of a terminal group, wherein the malicious traffic template of the terminal group comprises the traffic template of the first device.

According to an aspect of the present disclosure, there is provided a method of generating malicious traffic, the method being performed by a computing apparatus and comprising obtaining normal traffic data related to a terminal group which comprises a first device not infected with malicious code, generating a virtual malicious traffic template of the first device infected with malicious code by using the normal traffic data of the first device and behavior analysis information of first malicious code and generating a malicious traffic template of the terminal group, wherein the malicious traffic template of the terminal group comprises the malicious traffic template related to the first device infected with the malicious code.

According to an aspect of the present disclosure, there is provided a computing apparatus comprising a memory into which a malicious traffic generation program is loaded and a processor which executes the malicious traffic generation program loaded into the memory, wherein the malicious traffic generation program comprises an instruction for obtaining traffic data transmitted from a first device infected with first malicious code or received by the first device; an instruction for generating a traffic template of the first device by analyzing the traffic data and an instruction for generating a malicious traffic template of a terminal group, wherein the malicious traffic template of the terminal group comprises the traffic template of the first device.

Other features and exemplary embodiments may be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which:

FIG. 7 illustrates examples of a device whose malicious traffic template is to be generated for each function of the device according to an embodiment;

FIG. 8 illustrates an example traffic template for each function of an AI speaker in order to explain a malicious traffic template for each function of a device according to an embodiment;

FIG. 10 illustrates a terminal group and device usage information of a user which are used to generate a malicious traffic template for each user of the terminal group according to an embodiment;

FIG. 13 illustrates examples of a terminal group whose malicious traffic template is to be generated according to an embodiment;

FIG. 14 is a diagram for explaining a method of generating a network packet to generate malicious traffic according to an embodiment;

FIG. 15 illustrates an example database of terminal group information according to an embodiment;

FIG. 16 illustrates an example database of user information of each terminal group according to an embodiment;

FIG. 17 illustrates an example database of device usage patterns of each user type according to an embodiment;

FIG. 18 illustrates an example database of device type information according to an embodiment;

FIG. 19 illustrates an example database of device function information according to an embodiment;

FIG. 20 illustrates an example database of traffic pattern information for each device function of a terminal group according to an embodiment;

FIG. 21 illustrates network packets used to generate malicious traffic data of a terminal group according to an embodiment.

DETAILED DESCRIPTION

Hereinafter, embodiments of the present disclosure will be described with reference to the attached drawings. Advantages and features of the present disclosure and methods of accomplishing the same may be understood more readily by reference to the following detailed description of embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Like numbers refer to like elements throughout.

Unless otherwise defined, all terms including technical and scientific terms used herein have the same meaning as commonly understood by one of ordinary skill in the art to which this disclosure belongs. Further, it will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

It will be understood that the terms "comprise" and/or "comprising" when used herein, specify some stated components, steps, operations and/or elements, but do not preclude the presence or addition of one or more other components, steps, operations and/or elements.

Hereinafter, embodiments of the present disclosure will be described with reference to the drawings.

The configuration and operation of a system for generating a malicious traffic template of a terminal group according to an embodiment will now be described with reference to FIG. 1. As used herein, a terminal group may denote a set of devices connected directly/indirectly to one network. For example, the terminal group may be a set of devices whose Internet protocol (IP) addresses use the same network address but have different host addresses or may be a group of devices connected to one access point (AP) in an Internet of things (IoT) environment.

Figure 1:
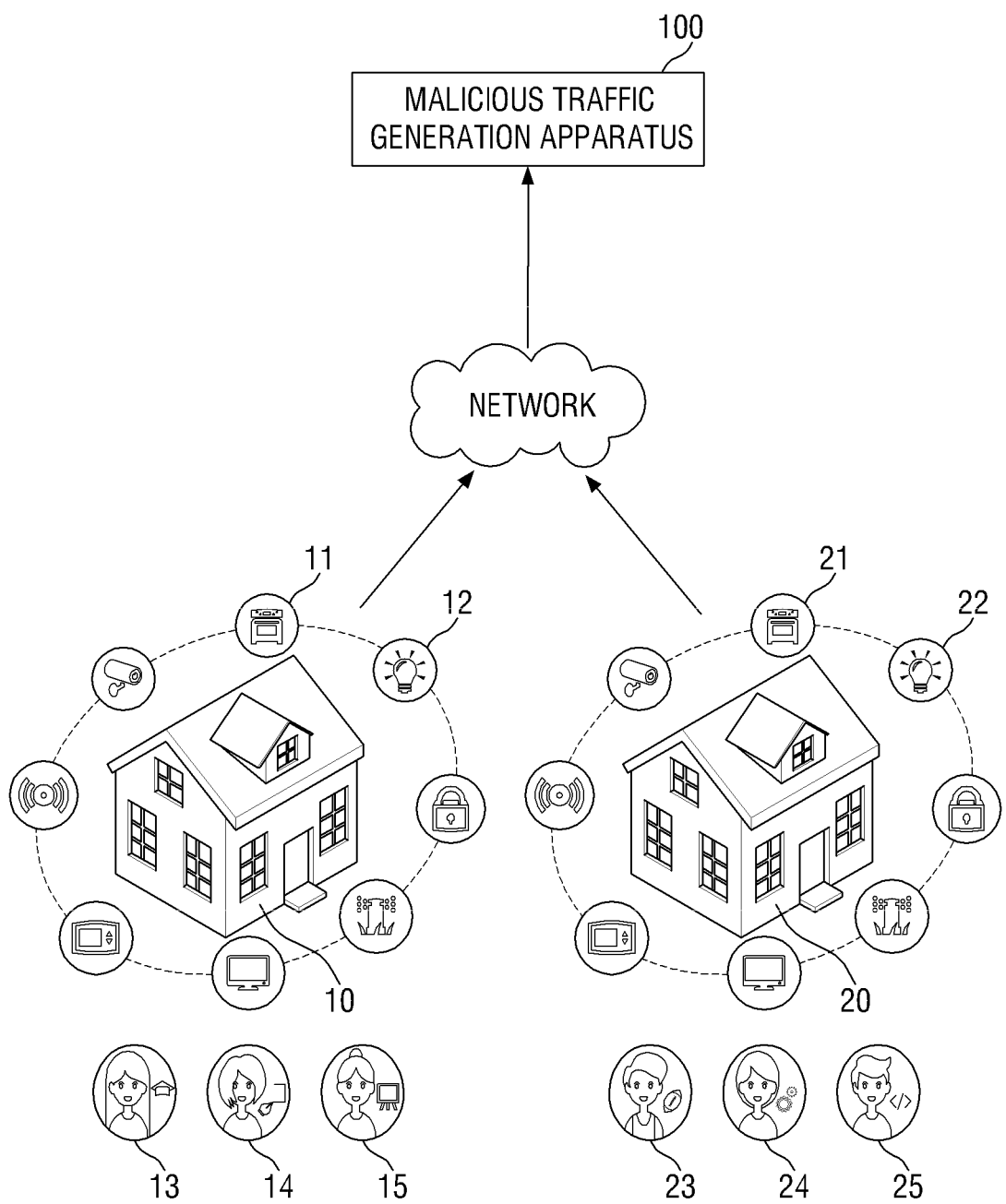
FIG. 1 is a diagram for explaining the configuration and operation of a system for generating a malicious traffic template according to an embodiment.

Referring to FIG. 1, a malicious traffic generation apparatus 100 may generate malicious traffic templates for a plurality of terminal groups 10 and 20 by using traffic data generated by the terminal groups 10 and 20 and collected through a network. A first terminal group 10 may include a plurality of devices 11 and 12, and a plurality of users 13, 14 and 15 may use at least one of the devices 11 and 12 of the first terminal group 10. In addition, a second terminal group 20 may include a plurality of devices 21 and 22, and a plurality of users 23, 24 and 25 may use at least one of the devices 21 and 22 of the second terminal group 20.

The malicious traffic generation apparatus 100 may collect traffic data received by the devices 11, 12, 21 and 22 of the terminal groups 10 and 20 or traffic data transmitted from the devices 11, 12, 21 and 22. In addition, the malicious traffic generation apparatus 100 may generate templates for virtual malicious traffic that can occur in the terminal groups 10 and 20 by using the collected traffic data.

In addition, a malicious traffic template may be generated for each malicious code. For example, when a first device 11 of the first terminal group 10 is infected with first malicious code, a malicious traffic template may be generated for each type of user 13, 14 or 15 of the first device 11 infected with the first malicious code, a malicious traffic template may be generated for each function of the first device 11 infected with the first malicious code, and a malicious traffic template may be generated for the entire first terminal group 10 including the first device 11 infected with the first malicious code.

The malicious traffic generation apparatus 100 may also collect normal traffic data of the devices 11, 12, 21 and 22 not infected with malicious code. In a method of generating a malicious traffic template according to embodiments, a malicious traffic template may be generated by inserting behavior information of specific malicious code to the collected normal traffic data. This will be described in detail later with reference to FIGS. 3 and 4.

Figure 2:
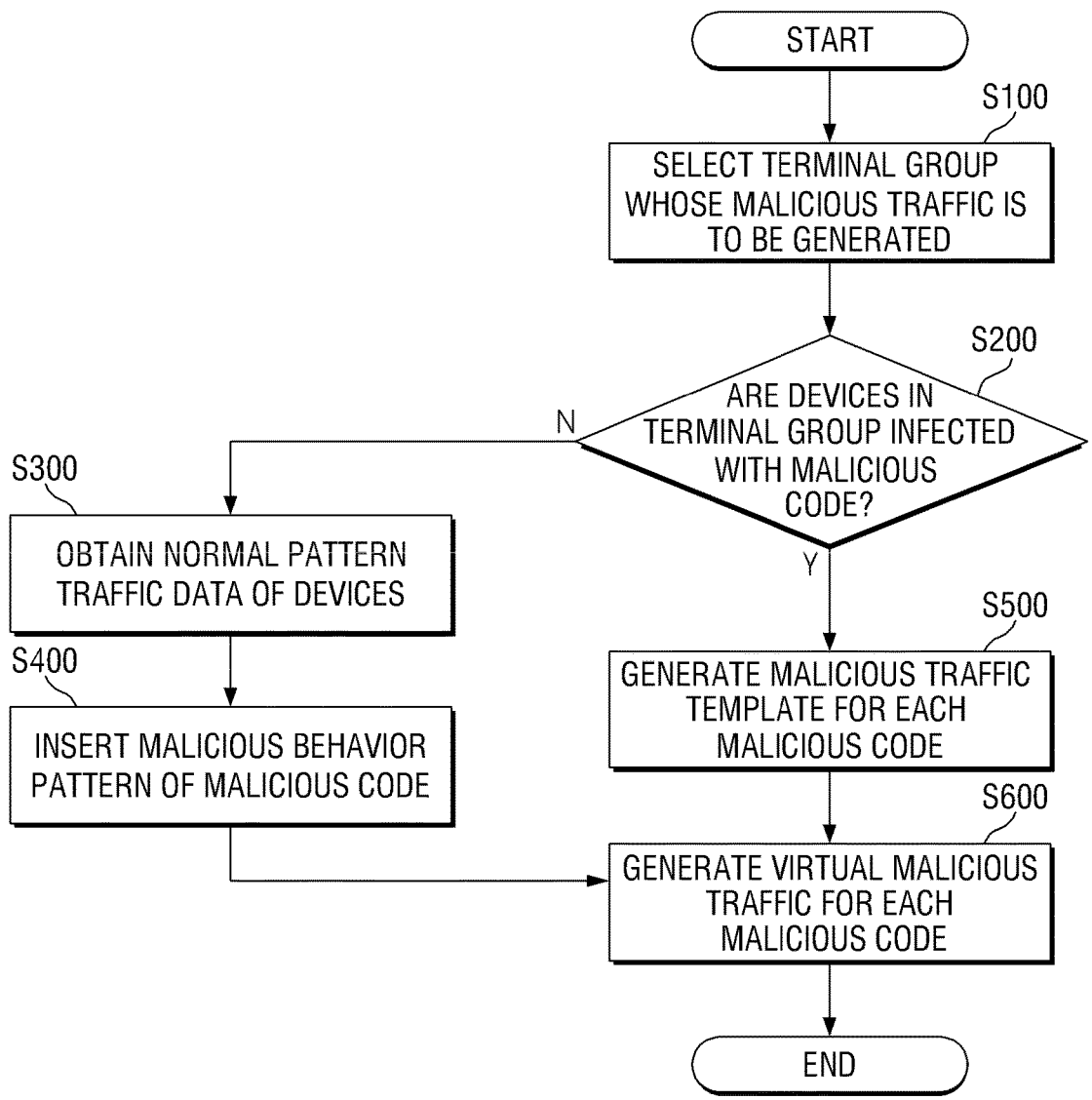
FIG. 2 is a flowchart illustrating a method of generating a malicious traffic template according to an embodiment.

A method of generating malicious traffic of a terminal group according to an embodiment will now be described with reference to FIG. 2.

In operation S100, a terminal group whose malicious traffic template is to be generated may be selected. The selected terminal group is a group of devices connected through a network as described above. Terminal groups may be connected through a network, in which case IP addresses of a plurality of devices within a terminal group may be structured to have, for example, one or more identical network addresses and different host addresses among a plurality of classes of IP addresses. However, it should be noted that this is merely an example of IP addresses used in a terminal group that generally uses one AP. Therefore, the terminal group selected in operation S100 may be, for example, one of a plurality of households existing in a specific area or one of a plurality of companies existing in one building.

In operation S200, it may be identified whether the devices in the terminal group are infected with malicious code. A method of generating a malicious traffic template of the terminal group which will be described below may vary depending on whether the devices are infected with malicious code.

In operation S300, if it is identified in operation S200 that the devices are not infected with malicious code, normal traffic data may be obtained from the devices in a normal state. The traffic data may be collected using, e.g., TCP-DUMP.

In operation S400, behavior information of malicious code may be inserted into the normal traffic data obtained in operation S300. The behavior information of the malicious code includes information about data generated when a device is infected with the malicious code. For example, the behavior information of the malicious code may include a pattern of malicious code behavior that occurs in a device infected with the malicious code. This will be described in detail with reference to FIG. 4.

If there is a device infected with malicious code, a malicious traffic template may be generated for each malicious code in operation S500 by collecting traffic data generated by the device. The traffic template may be generated for each function of the device, for each user of the device, and for each terminal group including the device. This will be described in detail later with reference to FIGS. 7 through 13.

In addition, when a malicious traffic template is generated for a device infected with malicious code that performs an inbound attack, traffic data received by the device infected with the malicious code may be collected. For example, the malicious code may perform an attack of blocking all access to the device. Since a problem occurring due to the malicious code that performs the inbound attack is caused by network data coming from the outside to the device, the computation of a computing apparatus can be minimized by collecting the traffic data received by the device.

Likewise, when a malicious traffic template is generated for a device infected with malicious code that performs an outbound attack, traffic data transmitted from the device infected with the malicious code may be collected. For example, the malicious code may perform an attack of allowing all access attempted by the device. Since a problem occurring due to the malicious code that performs the outbound attack is caused by network data going out from the device to the outside, the computation of the computing apparatus can be minimized by collecting the traffic data transmitted from the device.

In operation S600, a virtual malicious traffic template may be generated for the terminal group by using the malicious traffic templates generated in operations S400 and S500. A malicious traffic template may be generated using the normal traffic data and the malicious code behavior patterns generated in operation S400, a malicious traffic template may be generated using the malicious traffic template generated in operation S500 and noise traffic, and one malicious traffic template may also be generated using the malicious traffic templates generated in operations S400 and S500.

By generating malicious traffic templates using various combinations as described above, it is possible to generate various and efficient machine learning models using the generated malicious traffic templates. In particular, a malicious traffic template generated based on a device infected with malicious code can be used in a machine learning algorithm that performs supervised learning.

Figure 3:
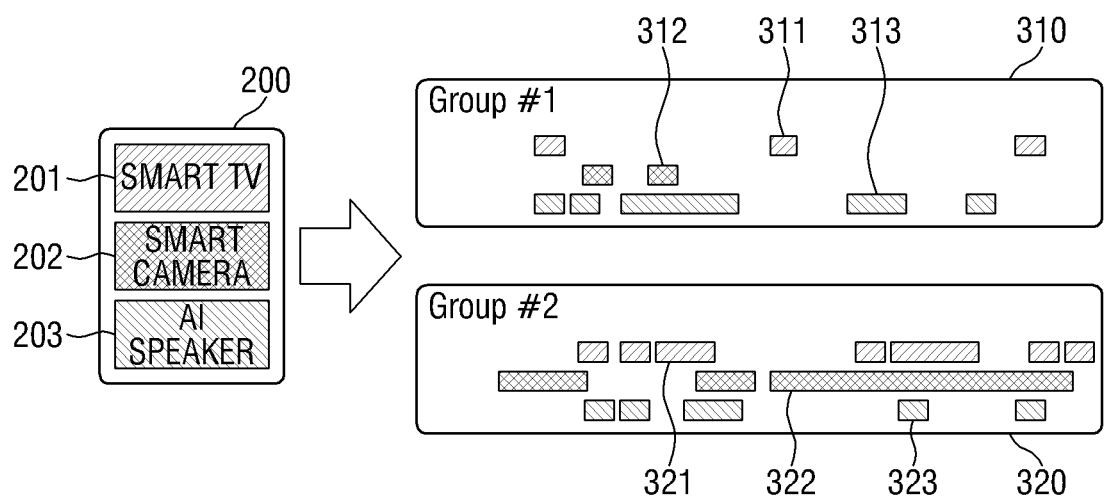
FIG. 3 illustrates examples of normal traffic data of a terminal group not infected with malicious code according to an embodiment.
Figure 4:
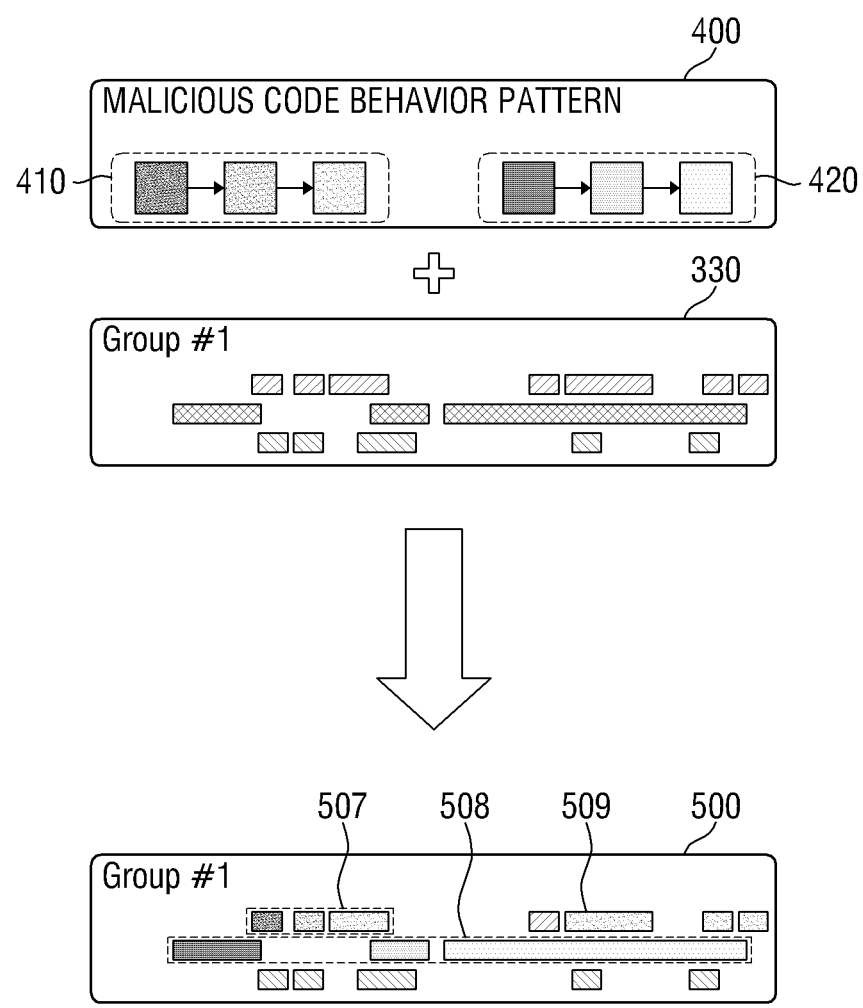
FIG. 4 is a diagram for explaining a method of generating a malicious traffic template by inserting a behavior pattern of malicious code into normal traffic data of a terminal group according to an embodiment.

A method of generating a malicious traffic template of a device not infected with malicious code by using normal traffic data obtained from the device will now be described with reference to FIGS. 3 and 4.

Examples of normal traffic data that can be generated by a terminal group will now be described with reference to FIG. 3. For example, when there is a device group 200 including one or more of a smart TV 201, a smart camera 202, and an AI speaker 203, various patterns of traffic data can be generated according to the type of user of each terminal group even if traffic data 310 and 320 generated by the terminal groups are composed of traffic data generated by the same devices. For example, the traffic data 310 generated by a first terminal group may be composed of traffic 313 received by the AI speaker 203 or transmitted from the AI speaker 203, traffic 312 received by the smart camera 202 or transmitted from the smart camera 202, and traffic 311 received by the smart TV 201 or transmitted from the smart TV 201. Likewise, the traffic data 320 generated by a second terminal group may be composed of traffic 323 obtained from the AI speaker 203, traffic 322 obtained from the smart camera 202, and traffic 321 obtained from the smart TV 201. However, the traffic 321, 322 and 323 may be different from the traffic 311, 312 and 313 existing in the traffic data 310 generated by the first terminal group in terms of information such as traffic generation time, frequency, etc.

A method of generating a malicious traffic template by inserting a malicious code behavior pattern into normal traffic obtained from a device will be described with reference to FIG. 4. Traffic of normal traffic data 330 of a device may be replaced with malicious code behavior patterns 410 and 420, or traffic having the malicious code behavior patterns 410 and 420 may be inserted into the normal traffic data 330. However, embodiments are not limited to this case, and it should be noted that various patterns of traffic can be generated by adding noise traffic between the malicious code behavior patterns 410 and 420 or replacing the malicious code behavior patterns 410 and 420 with the noise traffic.

In addition, the malicious code behavior patterns 410 and 420 may be extracted from a malicious code behavior pattern 400 of each known malicious code according to an embodiment. The malicious code behavior patterns 410 and 420 may include a pattern in which a Mirai botnet, one kind of distributed denial of service attack (DDoS) malicious code, generates traffic by combining character strings and a pattern in which a Leet botnet generates traffic by accessing a local file of a device to damage content and then mixing the content.

A malicious traffic template 500 generated for a terminal group may include one or more of malicious code behavior patterns 507 and 508, normal traffic, and noise traffic 509.

The random noise traffic 509 is traffic irrelevant to the malicious code behavior patterns 410 and 420 and may be inserted into the malicious traffic template 500 in various forms to generate various forms of malicious traffic templates 500. Since various forms of malicious traffic templates 500 are generated, the number of data models to be used in the learning of a machine learning algorithm used by a monitoring system for determining whether a terminal group is infected with malicious code may be increased, thereby increasing the accuracy of the machine learning algorithm.

Figure 5:
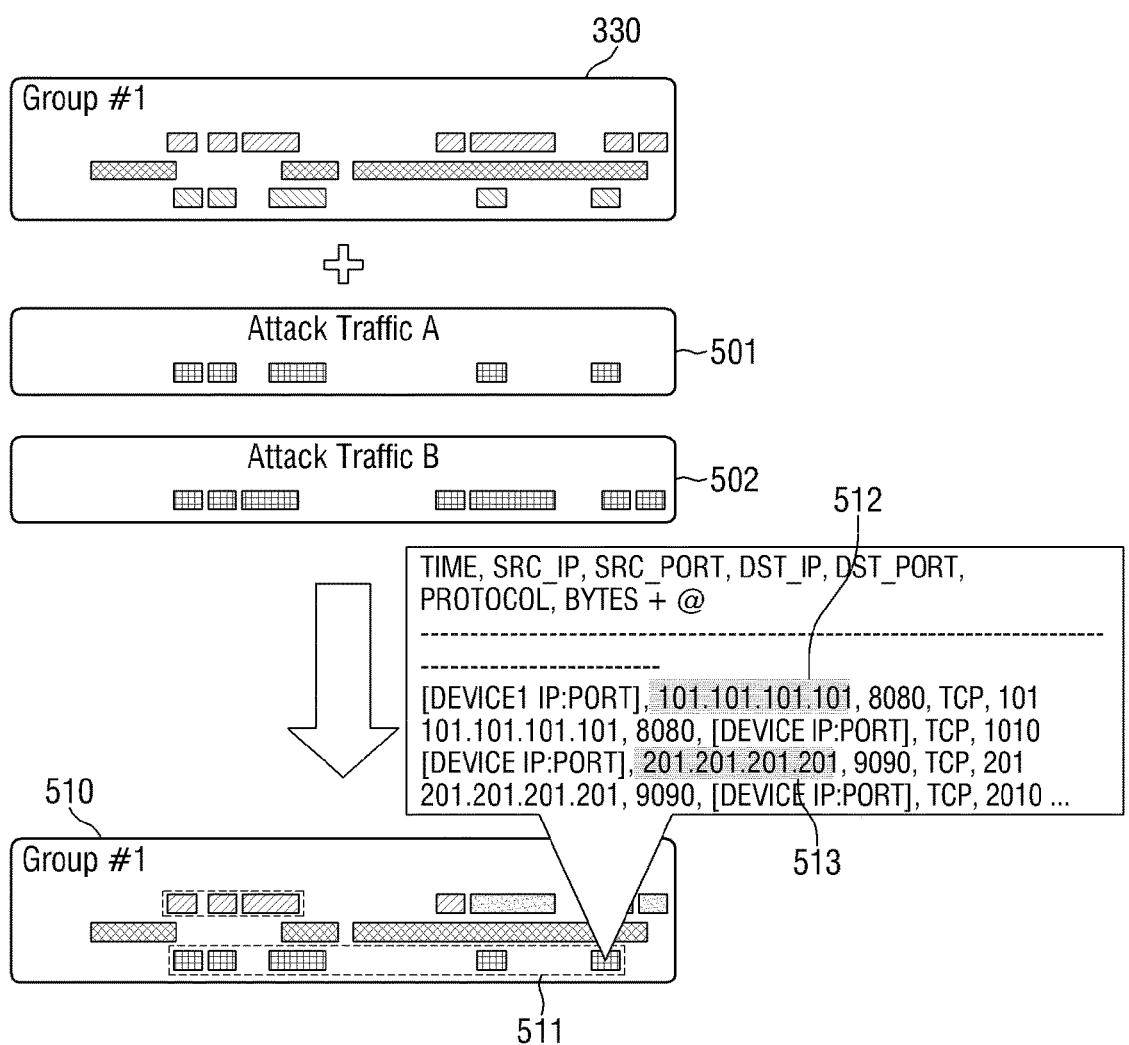
FIG. 5 is a diagram for explaining a method of generating a virtual malicious traffic template using traffic data of a terminal group infected with malicious code according to an embodiment.

A method of generating a terminal group's malicious traffic template 510 including malicious traffic templates 501 and 502 generated using traffic data obtained from a device infected with malicious code according to an embodiment will now be described with reference to FIG. 5. A method of generating the malicious traffic templates 501 and 502 related to the device infected with the malicious code by using the traffic data obtained from the device will be described later with reference to FIGS. 7 through 13.

Traffic of a terminal group's malicious traffic template 510 including malicious traffic templates related to the above specific device may include an IP address of a control & command (C&C) server of malicious code. Since the C&C server is a server that transmits a control command for controlling malicious code to perform a desired attack, a malicious traffic template of a terminal group infected with malicious code can be generated by inserting the IP address of the C&C server into traffic of the malicious traffic template. For example, if traffic is in the form of 'TIME, SRC_IP, SRC_PORT, DST_IP, DST_PORT, PROTOCOL, BYTES+ . . . ', the IP address of the C&C server may be inserted into the 'SRC_IP' field indicating an IP address from which the traffic was transmitted. Referring to FIG. 5, any one of '101.101.101.101' and '201.201.201.201' which are IP addresses 512 and 513 of the C&C server may be inserted into the place of 'SRC_IP' in traffic 511 of the malicious traffic template 510. A machine learning algorithm that learns this malicious traffic template as a model may detect traffic, which includes a packet containing the IP address of the C&C server, as malicious traffic.

Figure 6:
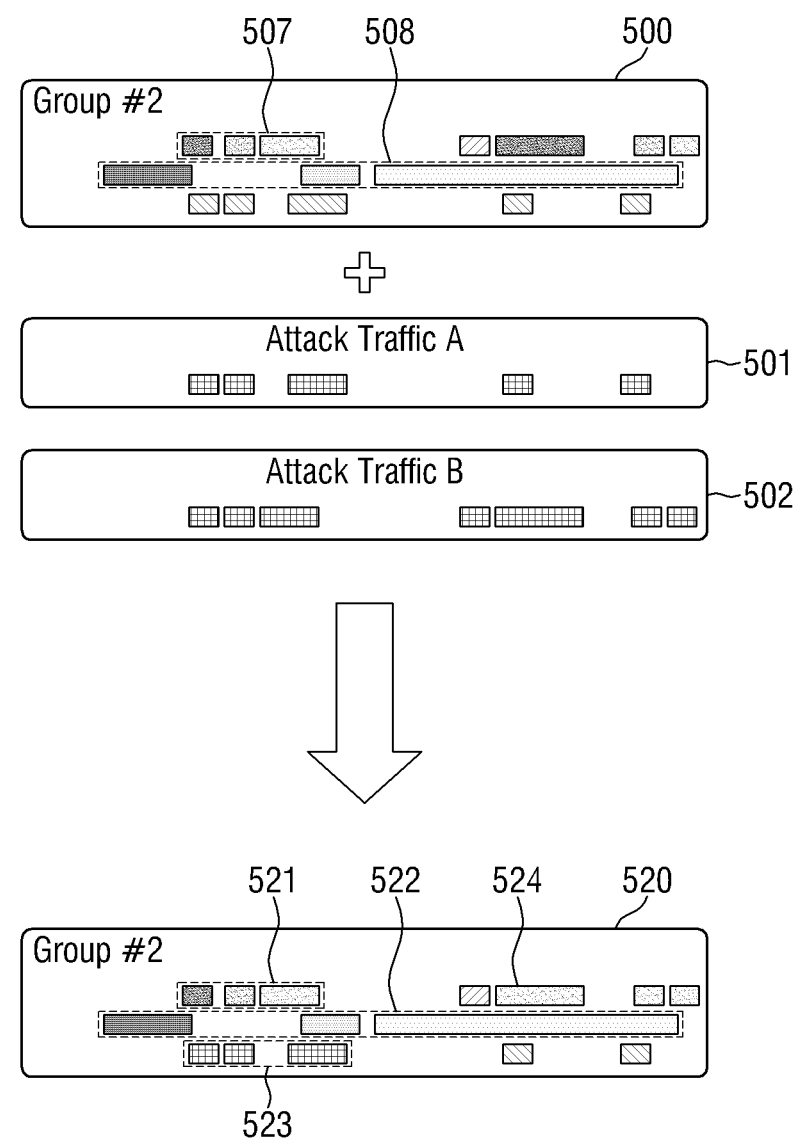
FIG. 6 is a diagram for explaining a method of generating a virtual malicious traffic template using normal traffic data of a terminal group, a malicious code behavior pattern, and traffic data of a terminal group infected with malicious code according to an embodiment.

Referring to FIG. 6, a malicious traffic template 520 of a terminal group may be generated using a malicious traffic template 500 generated by inserting malicious code patterns 507 and 508 into normal traffic of a device as described above and traffic templates 501 and 502 generated by analyzing traffic data of a device infected with malicious code.

For example, a terminal group's malicious traffic template 520 generated using the above method may include at least one of malicious code patterns 521 and 522, a malicious traffic template 523 of a device, and random noise traffic 524 irrelevant to malicious code. One or more of the malicious code patterns 521 and 522, the malicious traffic template 523 of the device, and the random noise traffic 524 can be replaced with traffic included in a normal traffic template of the terminal group or may be added to the traffic.

A method of generating malicious traffic templates of a device will now be described with reference to FIGS. 7 through 13.

FIG. 7 illustrates information about functions of each device. Since a malicious traffic template of a device according to an embodiment can be generated for each function of the device, example functions of each device will be described with reference to the table of FIG. 7.

An AI speaker of FIG. 7 may include any one or more of a weather check function, a news check function, a traffic information check function, and a music playback function as its individual functions. A smart TV may include a video application execution function as its individual function. A smart refrigerator may include an Internet search function as its individual function. A smart air conditioner may include at least one of an air information provision function and a function of operating the air conditioner from the outside as its individual function. In addition, a home camera may include a function of providing a video of an object moving in a space as its individual function, and a smart scale may include a weight display function as its individual function.

Any one or more of the AP speaker, the smart TV, the smart refrigerator, the smart air conditioner, the home camera, and the smart scale may include at least one of an Internet connection check function and a firmware software update check function as a common function.

A malicious traffic template of a device may be generated for each individual function of the device and for each common function. Since a different function is used in the device for each malicious code, if malicious traffic templates are generated according to various functions of the device, it is possible to generate virtual malicious traffic that is similar to traffic generated by a device actually infected with malicious code.

An example method of generating a traffic template for each function of an AI speaker 600 in order to generate a malicious traffic template of the AI speaker 600 will be described with reference to FIG. 8. The AI speaker 600 may include at least one of, for example, a weather forecast function, a music search/playback function, and a voice search function. A traffic template 530 of the AI speaker 600 may include traffic data related to functions used by the AI speaker 600 as time elapses.

In the current embodiment, a traffic template for each function of the AI speaker 600 may be generated to be similar to traffic data of an AI speaker in the normal state or traffic data of an AI speaker infected with malicious code. If the traffic template is generated to be similar to the traffic data of the AI speaker in the normal state, a process of generating a malicious traffic template related to the AI speaker 600 includes a process of inserting a malicious code behavior pattern into a traffic template generated in FIG. 9. On the other hand, if the traffic template is generated to be similar to the traffic data of the AI speaker infected with the malicious code, the process of generating the malicious traffic template related to the AI speaker 600 may optionally include the malicious code behavior pattern insertion process of FIG. 9.

The malicious traffic template 530 of the AI speaker 600 of FIG. 8 may include at least one of traffic data 531 generated by the use of the weather forecast function of the AI speaker 600 from 00:00 to 24:00, traffic data 532 generated by the use of the music search/playback function, and traffic data 533 generated by the use of the voice search function. Since the traffic template of the AI speaker 600 is generated for each function, it is possible to precisely generate virtual malicious traffic data that is similar to the traffic data of the AI speaker infected with the malicious code as described above.

Figure 9:
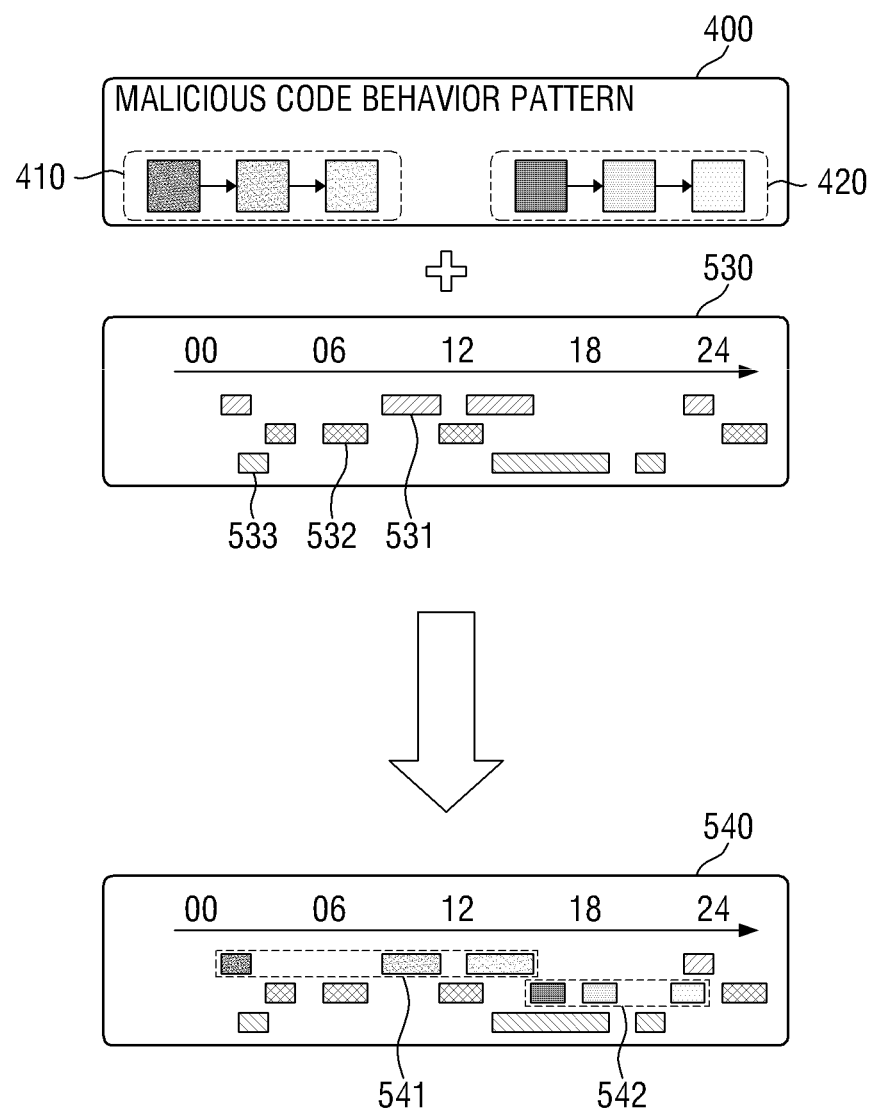
FIG. 9 is a diagram for explaining a method of inserting a behavior pattern of malicious code into a traffic template for each function of a device according to an embodiment.

A method of generating a malicious traffic template for each function of an AI speaker will be described in detail with reference to FIG. 9. To make the AI speaker's malicious traffic template 530 generated in FIG. 8 have a more similar pattern to the traffic data of the AI speaker infected with the malicious code, a malicious traffic template 540 for each function of the AI speaker 600 may be generated by further using a malicious behavior pattern 400 of malicious code.

The malicious behavior pattern 400 of the malicious code may include information about a function used in the AI speaker 600 for each malicious code and patterns 410 and 420 in which the function is used. The traffic template 530 for each function of the AI speaker 600 may be generated to include at least one of, for example, traffic data 531 related to the weather forecast function, traffic data 532 related to the music search/playback function, and traffic data 533 related to the voice search function.

For example, if certain malicious code shows malicious code behavior patterns in the traffic data 541 related to the weather forecast function and the traffic data 542 related to the music search/playback function, the virtual malicious traffic template 540 of the AI speaker 600 may be generated such that the traffic data 541 related to the weather forecast function includes the malicious code behavior pattern 410, and the traffic data 542 related to the music search/playback function includes the malicious code behavior pattern 420.

Figure 11:
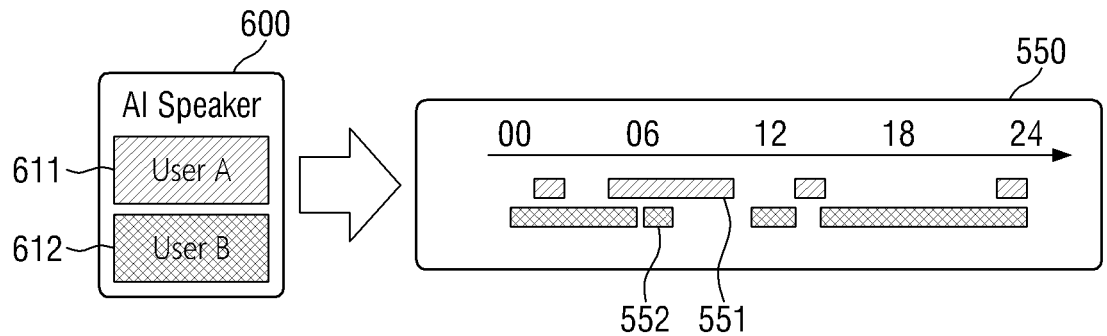
FIG. 11 illustrates an example traffic template for each user of an AP speaker in order to explain a malicious traffic template for each user of a device according to an embodiment.
Figure 12:
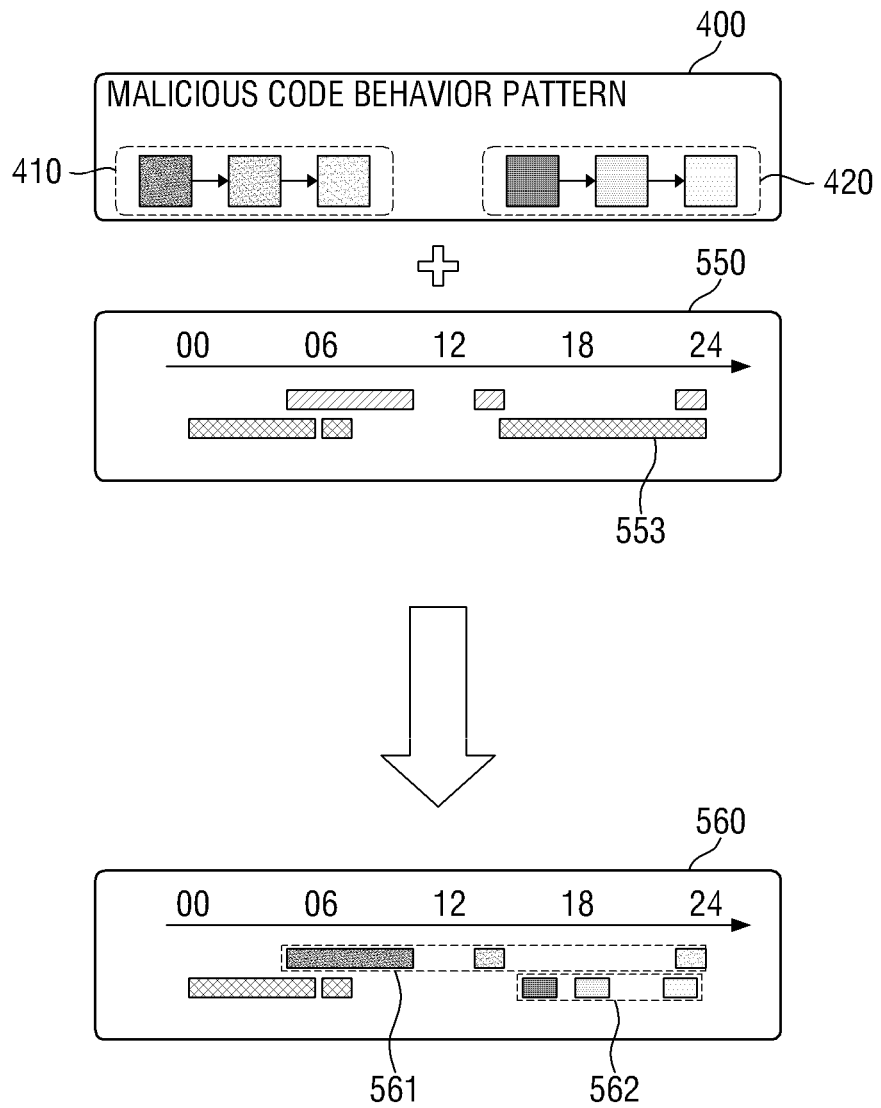
FIG. 12 is a diagram for explaining a method of inserting a behavior pattern of malicious code into a traffic template for each user of a device according to an embodiment.

A method of generating a malicious traffic template for each user of a device will be described with reference to FIGS. 10 through 12. A malicious traffic template of a device according to an embodiment may be generated for each user of the device. In addition, a malicious traffic template of a terminal group including the device may be generated for each user of the terminal group. Since a pattern of using a specific device in the terminal group is different for each malicious code, virtual malicious traffic similar to traffic generated by a device actually infected with malicious code may be generated according to the current embodiment.

Example traffic data related to usage patterns of user A and user B of a specific terminal group will be described with reference to FIG. 10. User A and user B of a terminal group including an AI speaker, a home camera, a smart air conditioner, a smart refrigerator and a smart TV may be users of one terminal group or may be users of different terminal groups composed of the same devices.

In addition, traffic data of the terminal group may be generated differently according to weekday usage patterns and weekend usage patterns of the above users. For example, traffic data of user A using the terminal group on weekdays may include traffic data generated by the terminal group for each of the time of waking up and getting ready for work, the working time, the time of returning home, and the sleeping time. In addition, traffic data of user A using the terminal group on weekends may include traffic data generated during the time of going out, the time of returning home, the sleeping time, and other times. Traffic data of the terminal group related to user B may also be generated for the weekdays and weekends. However, the device usage pattern of user B may be different from that of user A.

For example, since user A uses the home camera and the smart air conditioner of the terminal group during weekday working time, traffic data is generated. However, no traffic data is generated during the weekday working time of user B. Therefore, if traffic data of the terminal group is generated during the weekday working time of user B, it can be suspected as malicious traffic data. Since traffic data of the terminal group is generated differently for each user in the current embodiment, a precise virtual malicious traffic template can be generated.

Example traffic data generated differently for each user of an AI speaker will be described with reference to FIG. 11. Different traffic data may be generated for each of users using even the same device, e.g., an AI speaker. This is because each user uses a device in a different pattern as described above.

In the current embodiment, a traffic template for each user of the AI speaker may be generated to be similar to traffic data of an AI speaker in the normal state or traffic data of an AI speaker infected with malicious code. If the traffic template is generated to be similar to the traffic data of the AI speaker in the normal state, a process of generating a malicious traffic template related to the AI speaker includes a process of inserting a malicious code behavior pattern into a traffic template generated in FIG. 12. On the other hand, if the traffic template is generated to be similar to the traffic data of the AI speaker infected with the malicious code, the process of generating the malicious traffic template related to the AI speaker may optionally include the malicious code behavior pattern insertion process of FIG. 12.

For example, if user A 611 and user B 612 use an AI speaker 600, traffic data related to the use of the AI speaker 600 may be generated for each user as time elapses.

In this case, a traffic template 550 related to the AI speaker 600 may include at least one of a traffic template 551 related to user A 611 and a traffic template 552 related to user B 612. Each of the traffic template 551 related to user A 611 and the traffic template 552 related to user B 612 may be generated differently according to the usage pattern of the user as described above.

A method of generating a malicious traffic template for each user of an AI speaker will now be described in detail with reference to FIG. 12. A malicious traffic template for each user of an AI speaker may be generated using a malicious behavior pattern 400 of malicious code and a traffic template 550 generated for each user of the AI speaker.

The malicious behavior pattern 400 of the malicious code may include information about patterns 410 and 420 in which the AI speaker is used by a specific user in order to generate malicious traffic related to the AI speaker for each malicious code. The traffic template 550 for each user of the AI speaker may include traffic data 553 related to any one or more of user A and user B using the AI speaker.

For example, if certain malicious code shows malicious code behavior patterns in traffic data 561 and 562 related to specific patterns of a user of the AI speaker, a virtual malicious traffic template 560 of the AI speaker may be generated such that the traffic data related to the user's use of the AI speaker include the malicious code behavior patterns 410 and 420.

Specifically, the malicious traffic template 560 may be generated by replacing the traffic template 550 related to the user's use of the AI speaker with the malicious code behavior pattern 410 or may be generated by adding the malicious code behavior pattern 420 to the traffic template 550 related to the user's use of the AI speaker. However, embodiments are not limited to this case, and it should be noted that the malicious traffic template 560 can include the malicious code behavior patterns 410 and 420 in various ways.

A method of generating a virtual terminal group will be described in detail with reference to FIG. 13. To generate a virtual malicious traffic template of a terminal group, devices included in the terminal group and users of the terminal group may be designated.

Since a different malicious traffic template is generated according to the type of device included in a terminal group and according to a user, various learning models can be generated for the leaning of a machine learning algorithm.

For example, 'terminal group 1' may include one 'A-type user' and at least one of an AI speaker, a smart TV, a smart refrigerator, a smart air conditioner, and a smart camera. Likewise, each of terminal groups 2 through 5 may also include various users and devices.

A method of generating a network packet transmitted to a terminal group in order to generate a malicious traffic template of the terminal group will now be described with reference to FIGS. 14 through 21. To generate a virtual malicious traffic template of a terminal group, a network packet is transmitted or received for inducing the generation of traffic data of the terminal group to or from the terminal group.

Referring to FIG. 14, a network packet 740 transmitted to or received from a terminal group in order to generate malicious traffic data of the terminal group may be generated to include at least one of information 710 about each function of each device included in the terminal group, user information 720 of the terminal group, and information 730 about the terminal group. A database used to generate the network packet 740 that is transmitted to the terminal group in order to generate the malicious traffic data will now be described in detail with reference to FIGS. 15 through 20.

Referring to FIG. 15, a database of terminal groups may include a terminal group identifier as a key value and may further include at least one of Internet line bandwidth and a media access control (MAC) address of a terminal group AP according to embodiments.

Referring to FIG. 16, a database of users of each terminal group may include the terminal group identifier which is the key value of the database of the terminal groups of FIG. 15 and a device user type identifier as key values and may further include a user identifier according to embodiments.

Referring to FIG. 17, a database of device usage patterns of each user type may be generated using data about terminal groups and the database of the terminal group users. The database of the device usage patterns of each user type in FIG. 17 may include a device user type identifier and a device type code which is a key value of a database of device users as key values and may further include additional information defining the device usage patterns of each user type.

Since the database of the device usage patterns of each user type is generated, a malicious traffic template of a device can be generated variously and precisely based on various patterns in which the device is used by each user type. For example, if there is a user having a usage pattern similar to a behavior pattern of specific malicious code, since usage patterns of the user are managed in the database, it is possible to generate a malicious traffic template different from a normal usage pattern of the user by a slight degree that was not distinguishable before. Therefore, a machine learning algorithm trained using the malicious traffic template can distinguish various and fine differences between the behavior pattern of the malicious code and the usage pattern of the user.

Referring to FIG. 18, a database of types of devices included in a terminal group may include a device type code as a key value and may further include at least one of a device type name and a device type description according to embodiments. The device type code may be a specific identifier assigned to each device type. For example, a wire telephone, a wireless telephone, and a mobile phone which are of a communication device type may have the same device type code.

Referring to FIG. 19, a database of device functions may include a device function type code as a key value and may further include at least one of a device function type name and a device function type description according to embodiments. The device function type code may be a specific identifier assigned to each device function. For example, when each of a smart TV and a smart air conditioner has a function of requesting connection to an AP of a terminal group, the functions of requesting connection to the AP may have the same function type code.

Referring to FIG. FIG. 20, a database of traffic pattern information for each device function may be generated using the database of device types and the database of device functions according to embodiments. The database of the traffic pattern information for each device function may include the device type code which is the key value of the database of device types of FIG. 18 and the device function type code which is the key value of the database of device functions of FIG. 19 and may further include information defining a traffic pattern for each device/each device function.

Since the database of the traffic pattern information for each device function is generated, a malicious traffic template of a device can be generated variously and precisely based on various patterns in which the device is used for each device function of a terminal group. For example, if a pattern in which a specific function of a device is used is similar to a behavior pattern of specific malicious code, since the traffic pattern information for each device function is managed in the database, it is possible to generate a malicious traffic template different from a normal usage pattern of the function of the device by a slight degree that was not distinguishable before. Therefore, a machine learning algorithm trained using the malicious traffic template can distinguish various and fine differences between the behavior pattern of the malicious code and the normal usage pattern of the device.

Network packets transmitted/received according to a terminal group's malicious traffic template generated using the databases generated according to FIGS. 14 through 20 according to embodiments will now be described with reference to FIG. 21.

For example, when the IP address of an AI speaker in a terminal group is '192.213.213.22' and the IP address of an AP of the terminal group is '123.234.23.126', if a behavior pattern of malicious code concerns exchanging a signal between the AP and the AI speaker every second, a malicious traffic template may be generated such that, at an interval of 1 second from 06:00 on Jan. 1, 2018, the AI speaker transmits a packet having a size of 45 to the AP, the AP transmits a packet having a size of 46 to the AP speaker, and then the AI speaker transmits a packet having a size of 251 to the AP as illustrated in FIG. 21.

Figure 22:
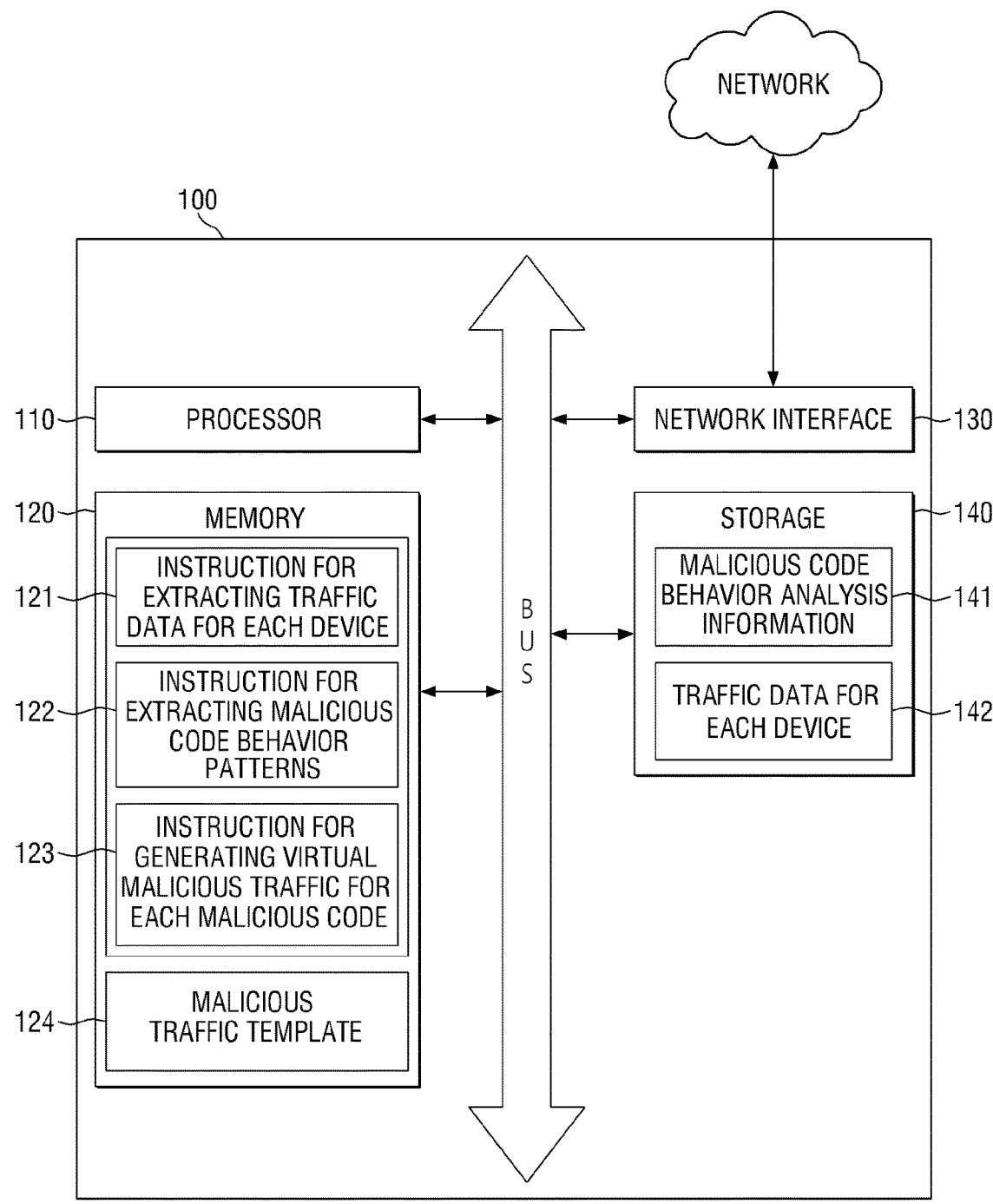
FIG. 22 illustrates the hardware configuration of an apparatus for generating a malicious traffic template of a terminal group according to an embodiment.

Referring to FIG. 22, a computing apparatus 100 for performing a method of generating a malicious traffic template of a terminal group according to a current embodiment may include a processor 110 and a memory 120 and may further include at least one of a storage 140, a network interface 130, and a system bus in some embodiments.

One or more instructions 121 through 123 loaded and stored in the memory 120 may be executed by the processor 110 and may generate a malicious traffic template 124 to be stored in the memory 120. It should be noted that, although not specifically described, the computing apparatus 100 for performing a device operating system identification method according to the current embodiment can perform the method of generating a malicious traffic template of a terminal group described above with reference to FIG. 1.

The network interface 130 may transmit a packet to a device included in a terminal group or receive a packet from the device. Information about the received packet may be stored in the storage 140.

The storage 140 may store malicious code behavior analysis information 141 including malicious code behavior patterns and traffic data 142 for each device which is received from each terminal group.

The instructions 121 through 123 may include an instruction 121 for extracting traffic data for each device included in a terminal group, an instruction 122 for extracting malicious code behavior patterns from the malicious code behavior analysis information 141 stored in the storage 140, and an instruction 123 for generating a virtual malicious traffic template of the terminal group for each malicious code.

In an embodiment, the instruction 121 for extracting the traffic data for each device may extract normal traffic from the devices included in the terminal group in order to insert malicious code into traffic data or may extract traffic data of a device infected with malicious code.

In an embodiment, the instruction 122 for extracting the malicious code behavior patterns may extract behavior patterns of malicious code in traffic data from the known malicious code behavior analysis information 141 in order to generate a malicious traffic template for each malicious code.

In an embodiment, the instruction 123 for generating the virtual malicious traffic template of the terminal group for each malicious code may generate a malicious traffic template for device use by user type using the extracted traffic data and malicious code behavior patterns or may generate a malicious traffic template for each device function and a malicious traffic template for the terminal group.

While the present disclosure has been particularly illustrated and described with reference to exemplary embodiments thereof, it will be understood by those of ordinary skill in the art that various changes in form and detail may be made therein without departing from the spirit and scope of the present disclosure as defined by the following claims. The exemplary embodiments should be considered in a descriptive sense only and not for purposes of limitation.

What is claimed is:

1. A method of generating malicious traffic, the method being performed by a computing apparatus and comprising:
    obtaining traffic data transmitted from or received by a first device, the first device being infected with first malicious code;
    generating a traffic template of the first device by analyzing the traffic data; and
    generating a malicious traffic template of a terminal group,
    wherein the malicious traffic template of the terminal group comprises the traffic template of the first device
    wherein generating the traffic template of the first device comprise adding random noise traffic irrelevant to the first malicious code to at least a portion of the traffic data; and
    using the generated malicious traffic template to generate a machine learning model.

2. The method of claim 1, wherein generating the traffic template of the first device by analyzing the traffic data comprises analyzing the traffic data received by the first device.

3. The method of claim 1, wherein generating the traffic template of the first device by analyzing the traffic data comprises analyzing the traffic data transmitted from the first device.

4. The method of claim 1, wherein generating the traffic template of the first device by analyzing the traffic data comprises analyzing traffic data related to a user of the terminal group.

5. The method of claim 4, wherein analyzing the traffic data related to the user of the terminal group comprises:
    generating a first traffic template of the first device by analyzing traffic data related to a first user of the terminal group; and
    generating a second traffic template of the first device by analyzing traffic data related to a second user of the terminal group.

6. The method of claim 1, wherein generating the traffic template of the first device by analyzing the traffic data comprises analyzing traffic data related to a function used in the first device.

7. The method of claim 6, wherein analyzing the traffic data related to the function used in the first device comprises:
    generating a third traffic template of the first device by analyzing traffic data related to a first function of the first device; and
    generating a fourth traffic template of the first device by analyzing traffic data related to a second function of the first device.

8. The method of claim 1, wherein the traffic template comprises a packet comprising an Internet protocol (IP) address of a control & command (C&C) server of the first malicious code.

9. The method of claim 1, wherein the malicious traffic template of the terminal group further comprises normal traffic data of the first device.

10. The method of claim 9, wherein generating the malicious traffic template of the terminal group comprises inserting a behavior pattern of the first malicious code into the normal traffic data of the first device.

11. The method of claim 1, wherein the malicious traffic template of the terminal group further comprises a traffic template of a second device included in the terminal group.

12. A method of generating malicious traffic, the method being performed by a computing apparatus and comprising:
    obtaining normal traffic data related to a terminal group which comprises a first device not infected with malicious code;
    generating a virtual malicious traffic template based on the normal traffic data of the first device and a behavior pattern of first malicious code; and
    generating a malicious traffic template of the terminal group,
    wherein the malicious traffic template of the terminal group comprises the virtual malicious traffic template;
    wherein generating the traffic template of the first device comprise adding random noise traffic irrelevant to the first malicious code to at least a portion of the traffic data; and
    using the generated malicious traffic template to generate a machine learning model.

13. The method of claim 12, wherein generating the virtual malicious traffic template comprises:

obtaining the behavior pattern of the first malicious code by analyzing behavior of the first malicious code; and generating the virtual malicious traffic template by inserting the behavior pattern into the normal traffic data.

14. A computing apparatus comprising:
a memory into which a malicious traffic generation program is loaded; and
a processor which executes the malicious traffic generation program loaded into the memory,
wherein the malicious traffic generation program comprises:
an instruction for obtaining traffic data transmitted from or received by a first device, the first device being infected with first malicious code or received by the first device;
an instruction for generating a traffic template of the first device by analyzing the traffic data; and
an instruction for generating a malicious traffic template of a terminal group,
wherein the malicious traffic template of the terminal group comprises the traffic template of the first device
wherein the instruction for generating the traffic template of the first device comprise adding random noise traffic irrelevant to the first malicious code to at least a portion of the traffic data; and
using the generated malicious traffic template to generate a machine learning model.

* * * * *